(12) United States Patent
Turlapati et al.

(10) Patent No.: US 10,823,096 B2
(45) Date of Patent: Nov. 3, 2020

(54) SYSTEM AND METHOD FOR SELF-ADJUSTING ENGINE PERFORMANCE PARAMETERS DURING FUEL QUALITY VARIATION

(71) Applicant: CUMMINS INC., Columbus, IN (US)

(72) Inventors: Agneya Turlapati, Indianapolis, IN (US); Robin J. Bremmer, Columbus, IN (US); Philipe F. Saad, Columbus, IN (US)

(73) Assignee: Cummins Inc., Columbus, IN (US)

(*) Notice: Subject to any disclaimer, the term of this patent is extended or adjusted under 35 U.S.C. 154(b) by 2 days.

(21) Appl. No.: 16/075,132

(22) PCT Filed: Feb. 4, 2016

(86) PCT No.: PCT/US2016/016600
§ 371 (c)(1),
(2) Date: Aug. 2, 2018

(87) PCT Pub. No.: WO2017/135957
PCT Pub. Date: Aug. 10, 2017

(65) Prior Publication Data
US 2018/0372013 A1  Dec. 27, 2018

(51) Int. Cl.
*F02D 41/14* (2006.01)
*F02D 35/02* (2006.01)
(Continued)

(52) U.S. Cl.
CPC ..... *F02D 41/1452* (2013.01); *F02D 19/0636* (2013.01); *F02D 35/023* (2013.01);
(Continued)

(58) Field of Classification Search
CPC .......... F02D 41/14; F02D 41/00; F02D 35/02; F02D 35/1452; F02D 35/0027;
(Continued)

(56) References Cited

U.S. PATENT DOCUMENTS 5,666,923 A * 9/1997 Collier, Jr. ................ C10L 3/06
   123/488
6,912,480 B2   6/2005 Black
(Continued)

FOREIGN PATENT DOCUMENTS

DE   19808829 A1    9/1999
DE  102011110669 A1  2/2013
(Continued)

OTHER PUBLICATIONS

International Search Report dated Apr. 14, 2016 in PCT/US2016/016600, 2 pages.
(Continued)

*Primary Examiner* — Binh Q Tran
(74) *Attorney, Agent, or Firm* — Faegre Drinker Biddle & Reath LLP

(57) ABSTRACT

A system and method for self-adjusting engine performance parameters in response to fuel quality variations that includes an exhaust sensor for measuring a level of carbon dioxide present in an exhaust manifold, at least one of a knock sensor and a cylinder pressure transducer for determining a location of peak pressure and a centroid, respectively, a controller in communication with the exhaust sensor and the at least one of the knock sensor and the cylinder pressure transducer, the controller correlating a methane number of the fuel used by the engine to a brake specific carbon dioxide value calculated using the level of carbon dioxide measured by the exhaust sensor and the at least one of the centroid and the location of peak pressure, and an adjusting mechanism, wherein the adjusting mechanism adjusts an engine performance parameter based on the determined methane number.

20 Claims, 10 Drawing Sheets

(51) Int. Cl.
F02D 41/00 (2006.01)
F02D 19/06 (2006.01)

(52) U.S. Cl.
CPC ......... F02D 35/027 (2013.01); F02D 35/028 (2013.01); F02D 41/0027 (2013.01); *F02D 19/0642* (2013.01); *F02D 41/0025* (2013.01); *F02D 2200/0611* (2013.01); *F02D 2200/0612* (2013.01); *Y02T 10/36* (2013.01)

(58) Field of Classification Search
CPC ......... F02D 2200/0611; F02D 41/1452; F02D 41/0027; F02D 35/027; F02D 35/023; F02D 19/08; F02D 19/10
See application file for complete search history.

(56) References Cited

U.S. PATENT DOCUMENTS

| | | | |
|---|---|---|---|
| 7,769,526 | B2 | 8/2010 | Chen et al. |
| 8,055,437 | B2 | 11/2011 | Proietty et al. |
| 8,249,795 | B2 | 8/2012 | Surnilla et al. |
| 8,495,996 | B2 | 7/2013 | Soltis et al. |
| 2002/0007816 | A1 | 1/2002 | Zur Loye et al. |
| 2005/0268886 | A1* | 12/2005 | Etou .................... F02D 19/088 123/406.29 |
| 2006/0254131 | A1* | 11/2006 | Waters ................. C10L 1/1641 44/459 |
| 2009/0287391 | A1 | 11/2009 | Duineveld et al. |
| 2010/0229809 | A1* | 9/2010 | Braly ..................... F02P 5/04 123/41.56 |
| 2012/0017870 | A1 | 1/2012 | Surnilla et al. |
| 2012/0210988 | A1 | 8/2012 | Willi |
| 2015/0053189 | A1* | 2/2015 | Leone ................ F02D 19/0634 123/575 |
| 2015/0153316 | A1 | 6/2015 | Abdul-Khalek |
| 2015/0262434 | A1* | 9/2015 | Schnorbus ............ G05B 17/02 702/123 |
| 2016/0108828 | A1* | 4/2016 | Glugla ................. F02P 5/1522 123/344 |

FOREIGN PATENT DOCUMENTS

| | | |
|---|---|---|
| DE | 102014207748 A1 | 10/2015 |
| EP | 2843220 A1 | 3/2015 |
| WO | 2015/172873 A2 | 11/2015 |

OTHER PUBLICATIONS

Written Opinion dated Apr. 14, 2016 in PCT/US2016/016600, 5 pages.
International Preliminary Report on Patentability dated Mar. 16, 2018 in PCT/US2016/016600, 8 pages.
European Search Report and Search Opinion Received for EP Application No. 16889605.8, dated Jan. 2, 2020, 8 pages.

* cited by examiner

SYSTEM AND METHOD FOR SELF-ADJUSTING ENGINE PERFORMANCE PARAMETERS DURING FUEL QUALITY VARIATION

RELATED APPLICATIONS

The present application is a national phase filing under 35 U.S.C. § 371 of International Application No. PCT/US2016/016600, titled "SYSTEM AND METHOD FOR SELF-ADJUSTING ENGINE PERFORMANCE PARAMETERS DURING FUEL QUALITY VARIATION," filed on Feb. 4, 2016, the entire disclosure of which being expressly incorporated herein by reference.

TECHNICAL FIELD OF THE DISCLOSURE

The present disclosure relates to a system and method for self-adjusting engine performance parameters based on fuel quality variations, and more particularly, self-adjusting performance parameters based on the methane number of fuel used by an engine.

BACKGROUND OF THE DISCLOSURE

Gasoline, diesel and gaseous fuels are mixtures of hydrocarbons, which are compounds that contain hydrogen and carbon atoms. In a "perfect" engine, oxygen in the air would convert all the hydrogen in the fuel to water and all the carbon in the fuel to carbon dioxide. Accordingly, a maximum level of carbon dioxide would be obtained when there is just enough oxygen supplied to react with the carbon in the fuel. On the other hand, when too little air is provided or poor fuel and air mixing occurs, carbon monoxide and soot result and the level of carbon dioxide is low. Additionally, when too much air is provided, the level of carbon dioxide is also low as the extra air dilutes the carbon dioxide.

When a spark ignited engine is run on a gaseous fuel, the amount of carbon dioxide obtained in the engine exhaust gas varies depending on the methane number of the inlet fuel. The methane number of the fuel correlates to a hydrogen/carbon ratio of the fuel. Thus, depending on the inlet fuel quality, the engine air-fuel ratio may need to be adjusted. Accordingly, the methane number may be used to help with adjustments to achieve a maximum level of carbon dioxide by allowing the appropriate amount of fuel for an amount of air provided to be determined.

Thus, it would be advantageous to have a system and method for self-adjusting engine performance parameters in response to fuel quality variations wherein the performance parameters are adjusted based on a determined methane number of the fuel to provide a more controllable and fuel-efficient engine.

SUMMARY OF THE DISCLOSURE

In one embodiment of the present disclosure, a method for self-adjusting engine performance parameters in response to fuel quality variations is provided. The method includes sensing a level of exhaust carbon dioxide exiting an engine, and sensing at least one of a centroid of the engine and a location of peak pressure in the engine. The method further includes calculating a brake specific carbon dioxide value from the level of exhaust carbon dioxide using correlations within a controller, determining a methane number of fuel used by the engine from the determined brake specific carbon dioxide value and the at least one of the centroid and the location of peak pressure using correlations within the controller, and determining an optimized air-fuel ratio from the methane number. The method also includes the step of adjusting at least one engine performance parameter in response to the optimized air-fuel ratio.

In one aspect of the method, calculating the brake specific carbon dioxide value from the level of exhaust carbon dioxide, determining the methane number of fuel used within the engine from the determined brake specific carbon dioxide value and the at least one of the centroid and the location of peak pressure, determining the optimized air-fuel ratio from the methane number, and adjusting at least one engine performance parameter based on the optimized air-fuel ratio are carried out by the controller.

In another aspect of the method, the controller is an engine control module.

In another aspect of the method, the level of exhaust carbon dioxide is measured by an exhaust sensor.

In a further aspect of the method, the centroid of the engine is determined by a cylinder pressure transducer.

In another aspect of the method, the location of peak pressure of the engine is determined by a knock sensor.

In another aspect of the method, determining the methane number of fuel used within the engine comprises using a table programmed into the controller. The table correlates the determined brake specific carbon dioxide value and the at least one of the centroid and the location of peak pressure with an associated methane number.

In a further aspect of the method, determining the optimized air-fuel ratio from the methane number comprises using a table programmed into the controller. The table correlates the methane number with an associated optimized air-fuel ratio.

In another aspect of the method, the method further includes monitoring the methane number using the controller.

In another aspect of the method, the method further includes sensing a level of inlet carbon dioxide of fuel entering the engine, and adjusting the determined brake specific carbon dioxide value in response to the level of inlet carbon dioxide.

In a further aspect of the method, the level of inlet carbon dioxide is measured by an inlet sensor.

In another embodiment of the present disclosure, an engine system includes a mixer configured to deliver air and fuel to the engine, an exhaust manifold coupled to the engine to route exhaust away from the engine, an exhaust sensor positioned to measure a level of carbon dioxide present in the exhaust within the exhaust manifold, at least one of a knock sensor and a cylinder pressure transducer, a controller in communication with the exhaust sensor and the at least one of the knock sensor and the cylinder pressure transducer, and an adjusting mechanism, wherein the adjusting mechanism adjusts at least one engine performance parameter based on a determined methane number. The knock sensor of the engine system determines a location of peak pressure within the engine and the cylinder pressure transducer determines a centroid of the engine. The controller of the engine system includes a plurality of programmable tables, wherein at least one of the plurality of programmable tables correlates a brake specific carbon dioxide value calculated using the level of carbon dioxide measured by the exhaust sensor and the at least one of the centroid and the location of peak pressure to a methane number of the fuel used by the engine, the controller being configured to determine the methane number using the tables.

In one aspect of the engine system, the adjusting mechanism is a fuel control valve. The fuel control valve controls an amount of fuel delivered to the mixer based on an optimized air-fuel ratio determined from the methane number by the controller.

In another aspect of the engine system, the optimized air-fuel ratio is determined using at least one of the plurality of programmable tables. The at least one of the plurality of programmable tables correlates the methane number with an associated optimized air-fuel ratio.

In another aspect of the engine system, the controller is an engine control module.

In a further aspect of the engine system, the engine system further comprises an inlet sensor positioned upstream of the engine that measures a level of intake carbon dioxide, and a correcting processor that adjusts the determined brake specific carbon dioxide value in response to the level of intake carbon dioxide measured by the inlet sensor.

In a further embodiment of the present disclosure, an engine control module coupled to an engine for self-adjusting engine performance parameters in response to fuel quality variations is provided. The engine control module is configured to receive an exhaust carbon dioxide value from an exhaust sensor and at least one of a centroid value from a cylinder pressure transducer and a location of peak pressure value from a knock sensor, process the exhaust carbon dioxide value and the at least one of the centroid value and the location of peak pressure value and control an adjusting mechanism in response to the processed exhaust carbon dioxide value and the processed at least one of the centroid value and the location of peak pressure value.

In one aspect of the engine control module, the engine control module is also configured to determine a brake specific carbon dioxide value from the exhaust carbon dioxide value and the at least one of the centroid and the location of peak pressure.

In another aspect, the engine control module is configured to determine a methane number of fuel used by the engine from the determined brake specific carbon dioxide value and the processed at least one of the centroid value and the location of peak pressure value.

In a further aspect, the engine control module is configured to receive an inlet carbon dioxide value from an inlet sensor, and adjust the determined brake specific carbon dioxide value based on the inlet carbon dioxide value.

BRIEF DESCRIPTION OF THE DRAWINGS

Advantages and features of the embodiments of this disclosure will become more apparent from the following detailed description of exemplary embodiments when viewed in conjunction with the accompanying drawings, wherein.

Figure 1:
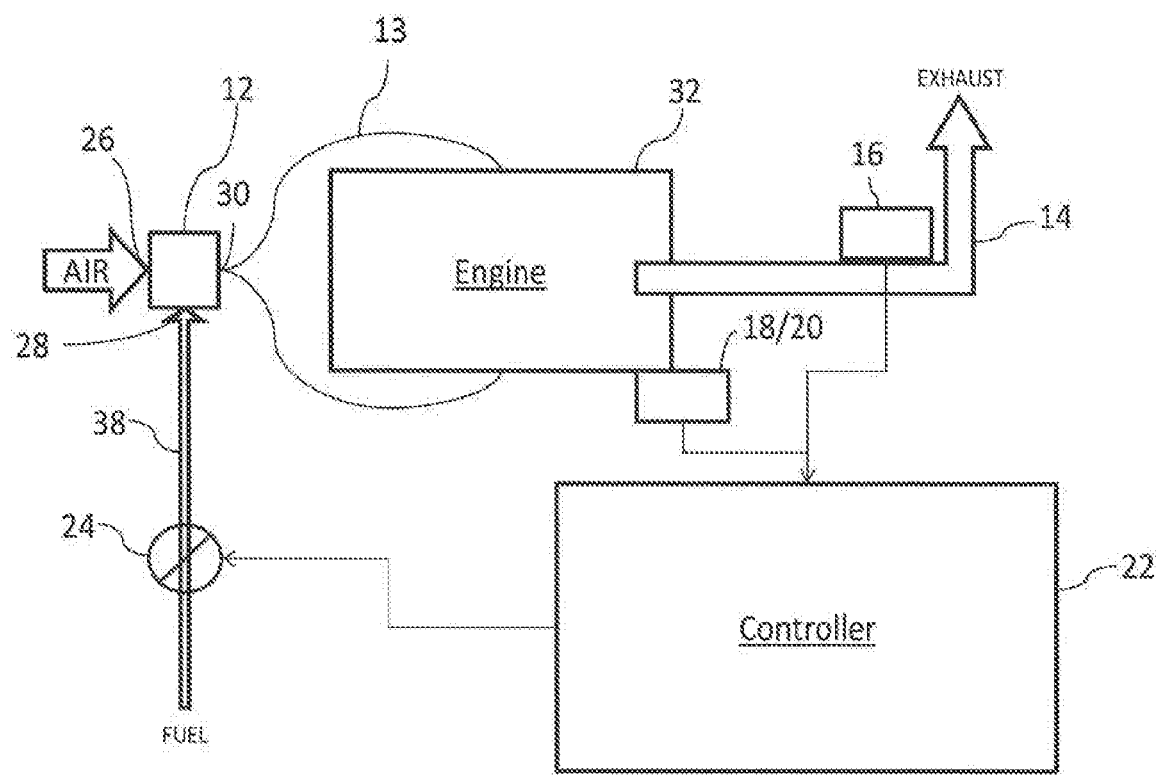
FIG. 1 is a schematic view of an engine system of the present disclosure including a mixer, an exhaust manifold, an exhaust sensor, at least one of a knock sensor and a cylinder pressure transducer, a controller and an adjusting mechanism.

Corresponding reference characters indicate corresponding parts throughout the several views. Although the drawings represent embodiments of the present disclosure, the drawings are not necessarily to scale and certain features may be exaggerated in order to better illustrate and explain the present disclosure. The exemplifications set out herein illustrate embodiments of the disclosure, in one form, and such exemplifications are not to be construed as limiting the scope of the disclosure in any manner.

DETAILED DESCRIPTION OF THE DRAWINGS

Figure 3:
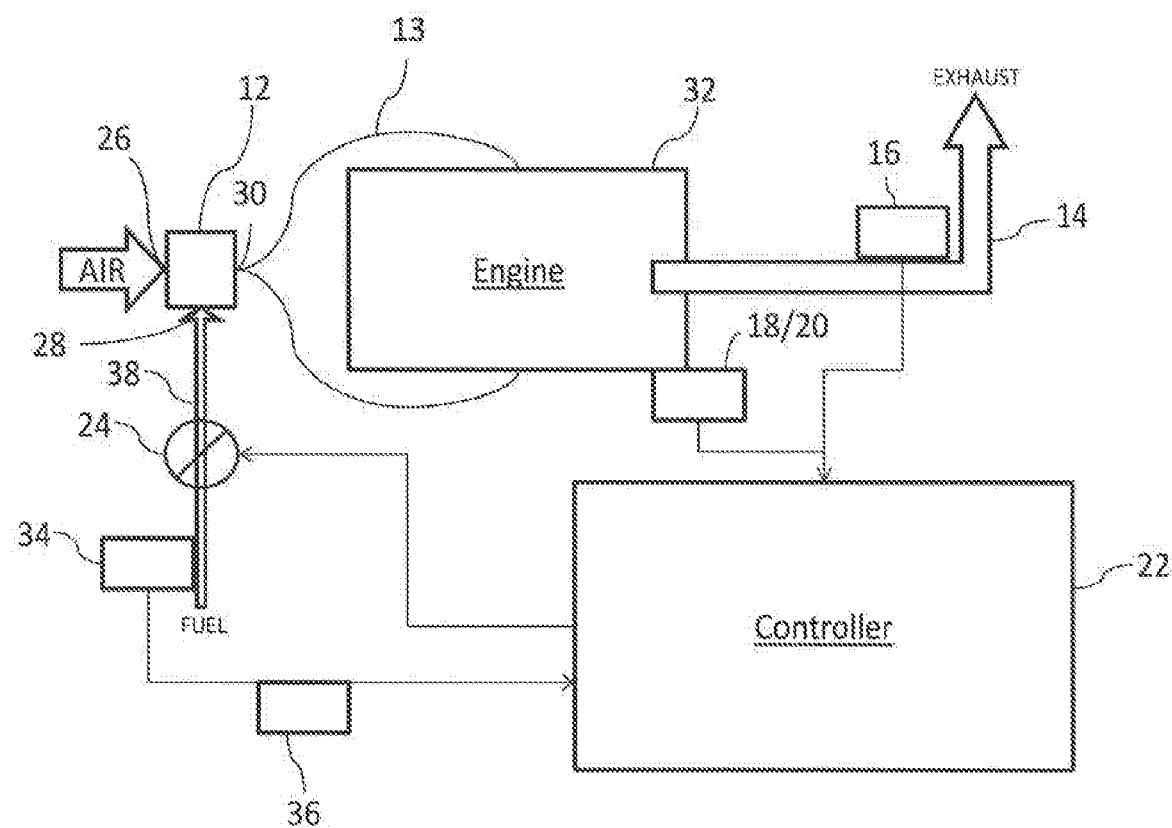
FIG. 3 is a schematic view of an engine system of the present disclosure including a mixer, an exhaust manifold, an exhaust sensor, an inlet sensor, a correcting mechanism, at least one of a knock sensor and a cylinder pressure transducer, a controller and an adjusting mechanism.

Referring to FIGS. 1 and 3, an engine system 10 generally includes a mixer 12, an inlet manifold 13, an exhaust manifold 14, an exhaust sensor 16, a knock sensor 18 and/or a cylinder pressure transducer 20, a controller 22, an adjusting mechanism 24 and an engine 32. Generally, engine system 10 further includes a center exhaust manifold positioned between cylinder heads of engine 10 (not shown). In various embodiments, engine system 10 may also include at least one turbocharger, at least one charge air cooler, at least one throttle, a compressor bypass, and/or a compressor bypass valve. Additionally, in various embodiments, intake manifold 13 may extend into the center of the engine between the engine's cylinder heads while exhaust manifold 14 includes portions extending along the sides of the engine or intake manifold 13 may include portions along the sides of the engine while exhaust manifold 14 extends out of the center of the engine between the engine's cylinder heads.

In more detail and still referring to FIGS. 1 and 3, mixer 12 generally includes at least two inlets 26, 28 and at least one outlet 30. Air and fuel may be introduced into mixer 12 through inlets 26, 28, and the mixture of air and fuel may then be released from mixer 12 through outlet 30 to engine 32. In various embodiments, a fuel line 38 is fluidly coupled to inlet 28 such that fuel line 38 provides fuel to mixer 12.

Figure 2:
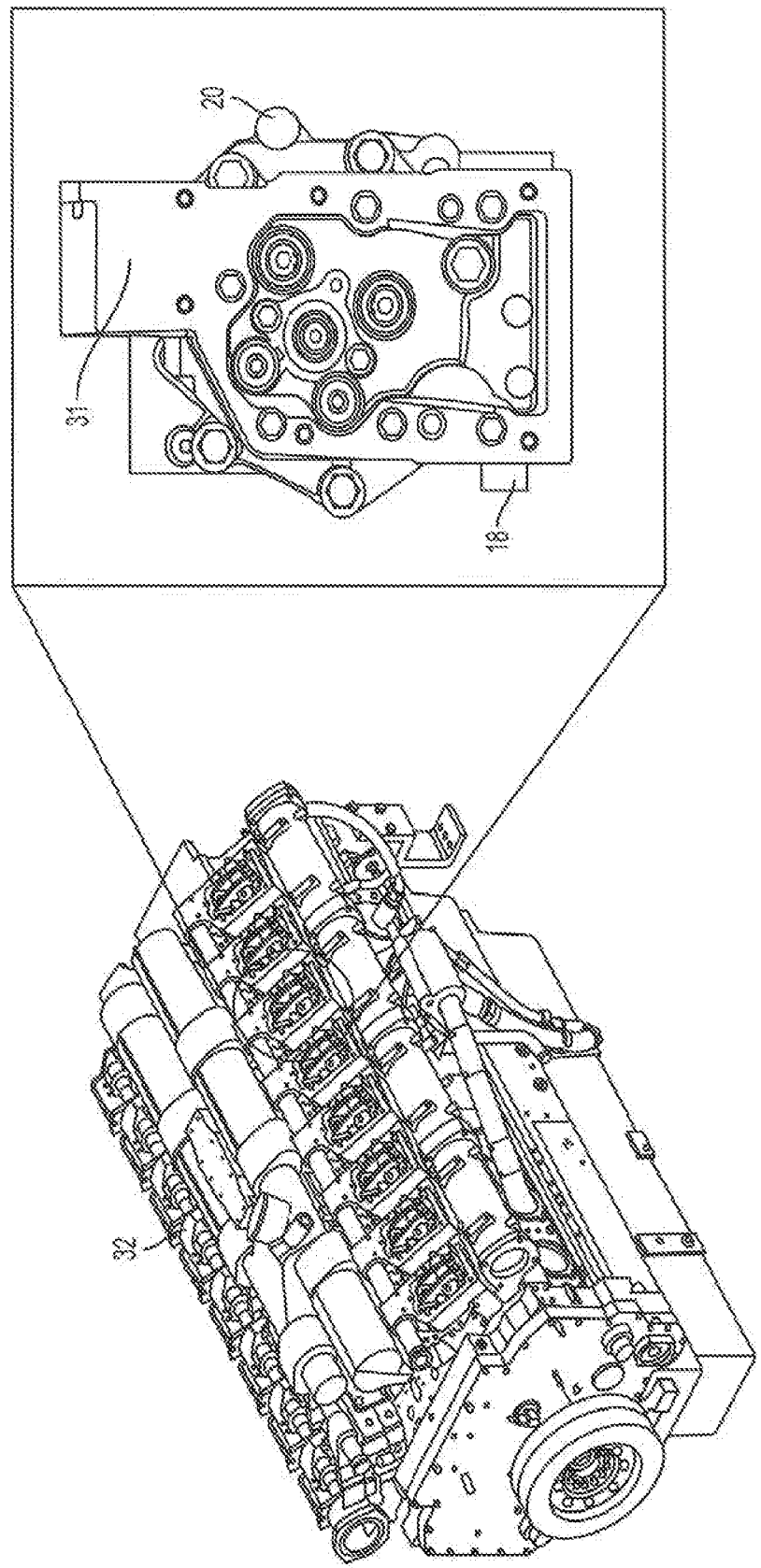
FIG. 2 is a schematic view of an engine of the engine system of FIG. 1 with an expanded view showing the placement of the knock sensor and the cylinder pressure transducer on a cylinder head of the engine.

Referring to FIGS. 1-3, exhaust manifold 14 is coupled to engine 32 to route exhaust gases resulting from fuel used in engine 32 away from engine 32. Exhaust sensor 16 is positioned along exhaust manifold 14 such that exhaust sensor 16 may measure a level of carbon dioxide present in the exhaust gases within exhaust manifold 14. In various embodiments, exhaust sensor 16 may be positioned at any location after the cylinder(s) of the engine. For instance, exhaust sensor 16 may be positioned along the exhaust manifold, at a turbo charger inlet, at a turbo charger outlet or at an exhaust stack.

Furthermore, knock sensor 18 and/or cylinder pressure transducer 20 are generally in communication with engine 32. In various embodiments, knock sensor 18 and/or cylinder pressure transducer 20 are coupled to at least one cylinder head(s) 31 of engine 32, as shown in FIG. 2. In various embodiments, knock sensor 18 and/or cylinder pressure transducer 20 may be coupled to each cylinder head 31 of engine 32. Furthermore, in various embodiments, knock sensor 18 may be used to determine a location of peak pressure within engine 32. Generally, knock sensor 18 is a simple accelerometer that measures vibration levels on a cylinder head 31 of each cylinder of engine 32. Knock sensor 18 converts the measured vibration levels into an output voltage. The output voltage from knock sensor 18 is directly proportional to the engine combustion quality. By processing the signal coming from the knock sensor, the location of peak pressure can be determined. Location of peak pressure is the location at which the maximum cylinder pressure occurs for each combustion cycle. Additionally, in various embodiments, cylinder pressure transducer 20 may be used to determine a centroid of engine 32. Cylinder pressure transducer 20 is a pressure measurement device which records cylinder pressure for a cylinder on which it is placed. Once the cylinder pressure is obtained, it can be converted to a heat release rate which shows the quality of combustion. Centroid is the point in the heat release rate where 50% of combustion is complete. The centroid is inversely proportional to engine combustion quality. Thus, if the combustion gets slower, the centroid increases in crank angle degrees.

With reference to FIGS. 1 and 3, adjusting mechanism 24 adjusts an engine performance parameter based on a determined methane number. In general, adjusting mechanism 24 is manipulated by controller 22. In various embodiments, the engine performance parameter may include the quantity of fuel provided. In an exemplary embodiment, adjusting mechanism 24 may be a fuel control valve, wherein the fuel control valve controls the amount fuel delivered to mixer 12 based on an optimized air-fuel ratio determined from the methane number by controller 22.

Controller 22 is generally in communication with exhaust sensor 16, knock sensor 18 and/or cylinder pressure transducer 20 and adjusting mechanism 24. Additionally, controller 22 may include a plurality of programmable tables. In an exemplary embodiment of the present disclosure, controller 22 is an engine control module. In certain embodiments, controller 22 forms a portion of a processing subsystem including one or more computing devices having memory, processing, and communication hardware. The controller 22 may be a single device or a distributed device, and the functions of the controller may be performed by hardware and/or as computer instructions on a non-transient computer readable storage medium.

Furthermore, in certain embodiments, the controller 22 includes one or more processors, evaluators, regulators and/or determiners that functionally execute the operations of the controller 22. The description herein including processors, evaluators, regulators and/or determiners emphasizes the structural independence of certain aspects of the controller 22, and illustrates one grouping of operations and responsibilities of the controller. Other groupings that execute similar overall operations are understood within the scope of the present application. Processors, evaluators, regulators and/or determiners may be implemented in hardware and/or as computer instructions on a non-transient computer readable storage medium, and may be distributed across various hardware or computer based components.

Certain operations described herein include operations to interpret and/or to determine one or more parameters or data structures. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

Example and non-limiting implementation elements that functionally execute the operations of the controller include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

Figure 7:
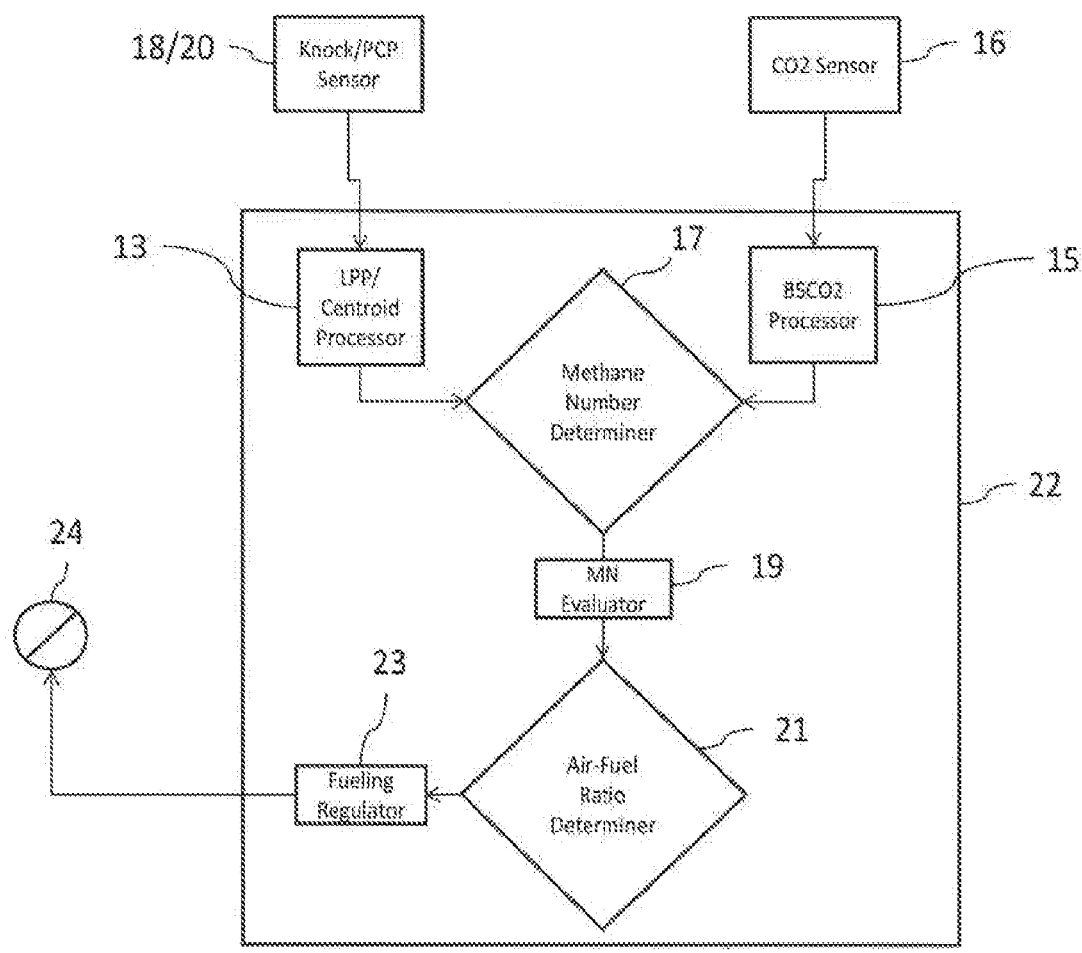
FIG. 7 is a schematic view of the controller configurations of the engine system of FIG. 1.

Referring now to FIG. 7, controller 22 generally includes one or more processors, evaluators, regulators and/or determiners, such as a centroid/location of peak pressure processor 13, a brake specific carbon dioxide processor 15, a methane number determiner 17, a methane number evaluator 19, an air-fuel ratio determiner 21, and a fueling regulator 23. Brake specific carbon dioxide processor 15 is generally configured to receive measurements of exhaust carbon dioxide levels from exhaust sensor 16, while centroid/location of peak pressure processor 13 is generally configured to receive signals from knock sensor 18 and/or cylinder pressure transducer 20. Furthermore, centroid/location of peak pressure processor 13 is configured to process the signals from knock sensor 18 and/or cylinder pressure transducer 20 to determine a location of peak pressure from knock sensor 18 and/or a centroid from cylinder pressure transducer 20. Additionally, brake specific carbon dioxide processor 15 is configured to calculate a brake specific carbon dioxide value from the level of exhaust carbon dioxide received. The brake specific carbon dioxide value is calculated using Formula I below, where $mf_{exh_{CO2}}$ is the mass flow of $CO_2$ in exhaust, Brk_pwr is the brake power of the engine, $MW_{CO2}$ is the molecular weight of $CO_2$, $MW_{exh}$ is the molecular weight of theoretical exhaust, $mf_{exh}$ is the mass flow of exhaust, and $CO2_{ppm}$ is the $CO_2$ concentration measured by the exhaust carbon dioxide sensor 16.

$$BSCO2 = \frac{mf_{exh_{CO2}}}{Brk\_pwr} \qquad \text{Formula I}$$

$$mf_{exh_{CO2}} = \left(\frac{MW_{CO2}}{MW_{exh}}\right) * mf_{exh} * CO2_{ppm}$$

Figure 4:
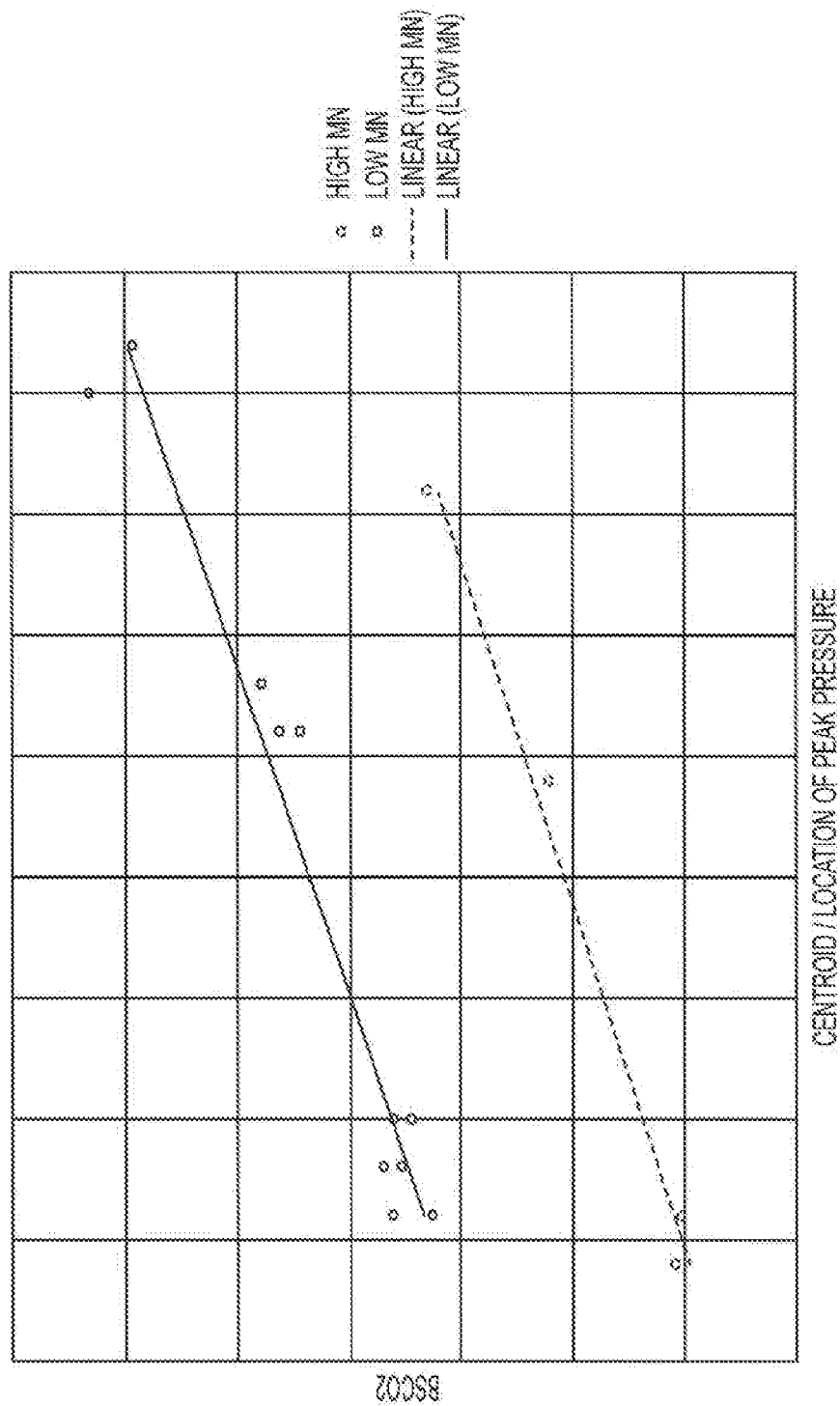
FIG. 4 is a plot of the relationship between the determined brake specific carbon dioxide values and centroids and/or locations of peak pressure for determining a methane number.
Figure 5:
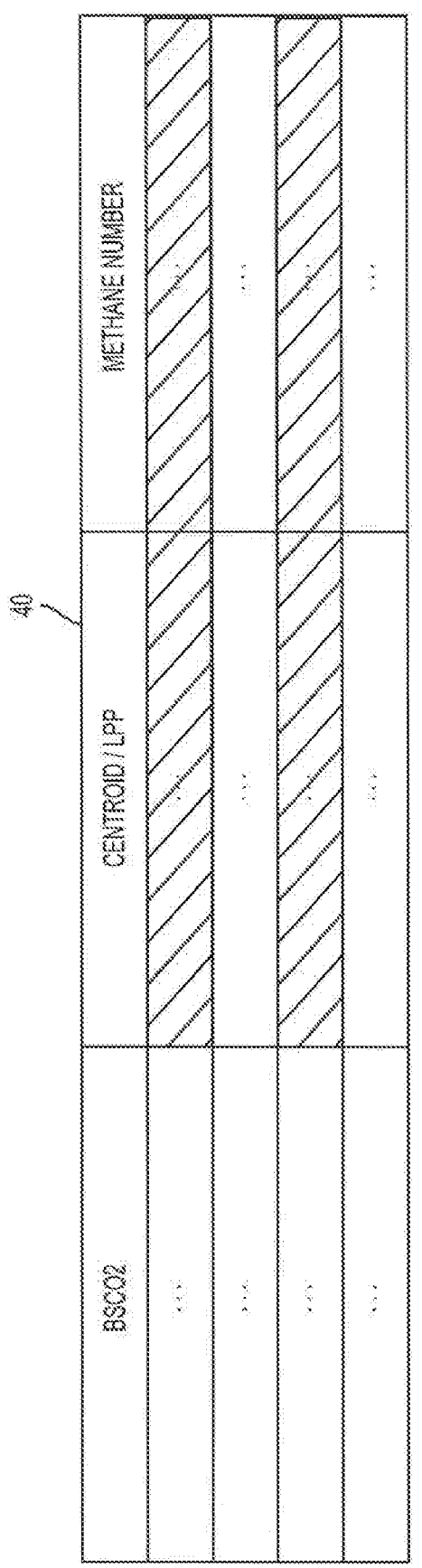
FIG. 5 is a schematic view of a programmable table of a methane number determiner.

Referring to FIGS. 3-5, methane number determiner 17, within controller 22, may be used to determine a methane number of fuel used within engine 32. The relationship by which the methane number can be determined is shown by plotting the determined brake specific carbon dioxide values against centroids/locations of peak performance, as shown in FIG. 4. Methane determiner 17, includes a programmable table 40, shown in FIG. 5, which is programmed with the relationships shown in FIG. 4 such that table 40 may correlate a determined brake specific carbon dioxide value and the centroid and/or the location of peak pressure with an associated methane number of the fuel.

Figure 6:
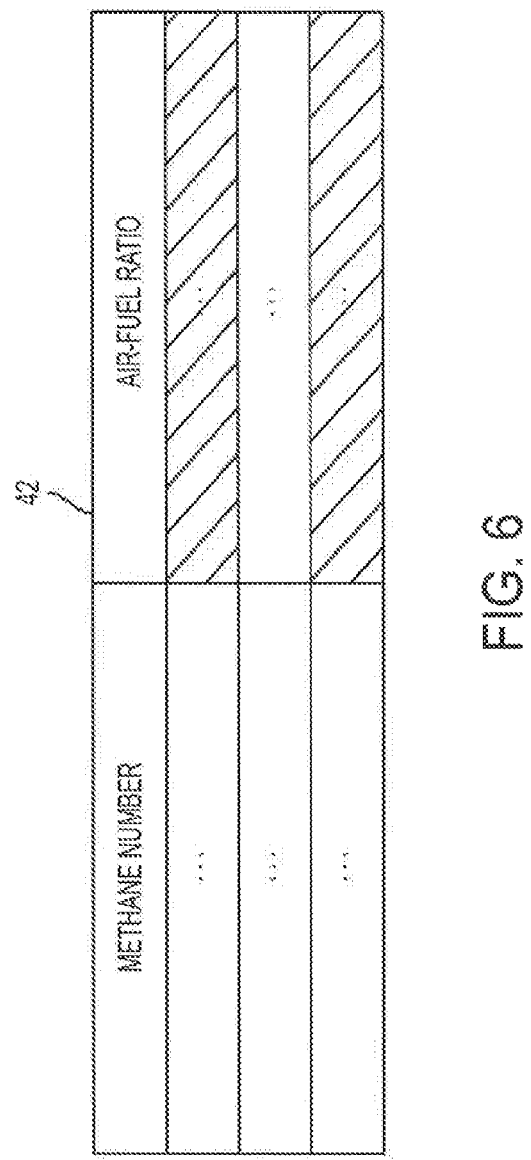
FIG. 6 is a schematic view of a programmable table of an air-fuel ratio determiner of the present disclosure.

With further reference to FIGS. 6 and 7, air-fuel ratio determiner 21 within controller 22 may be used to determine an optimized air-fuel ratio. Determiner 21 includes a programmable table 42 that is programmed with the hydrogen/carbon ratios of methane numbers, such that the table 42 correlates the determined methane number with an associated optimized air-fuel ratio. The optimized air-fuel ratio may then be used by fueling regulator 23 of controller 22 to adjust an engine performance parameter. The air-fuel ratio is adjusted by changing the fuel control valve position that controls the amount of fuel that is sent to the engine. Fueling regulator 23 may adjust the engine performance parameter by sending a target value to adjusting mechanism 24. In an exemplary embodiment, the engine performance parameter adjusted is the fuel quantity provided to mixer 12, and adjusting mechanism 24 is a fuel control valve. It should be understood that tables 40, 42, while described as being incorporated into controller 22, may be stored or generated on one or more separate devices that are accessed by controller 22 or distributed among controller 22 and one or more separate devices. Additionally, it should be understood that someone of skill in the art with the benefit of the present disclosure could construct these or other suitable tables.

Figure 8:
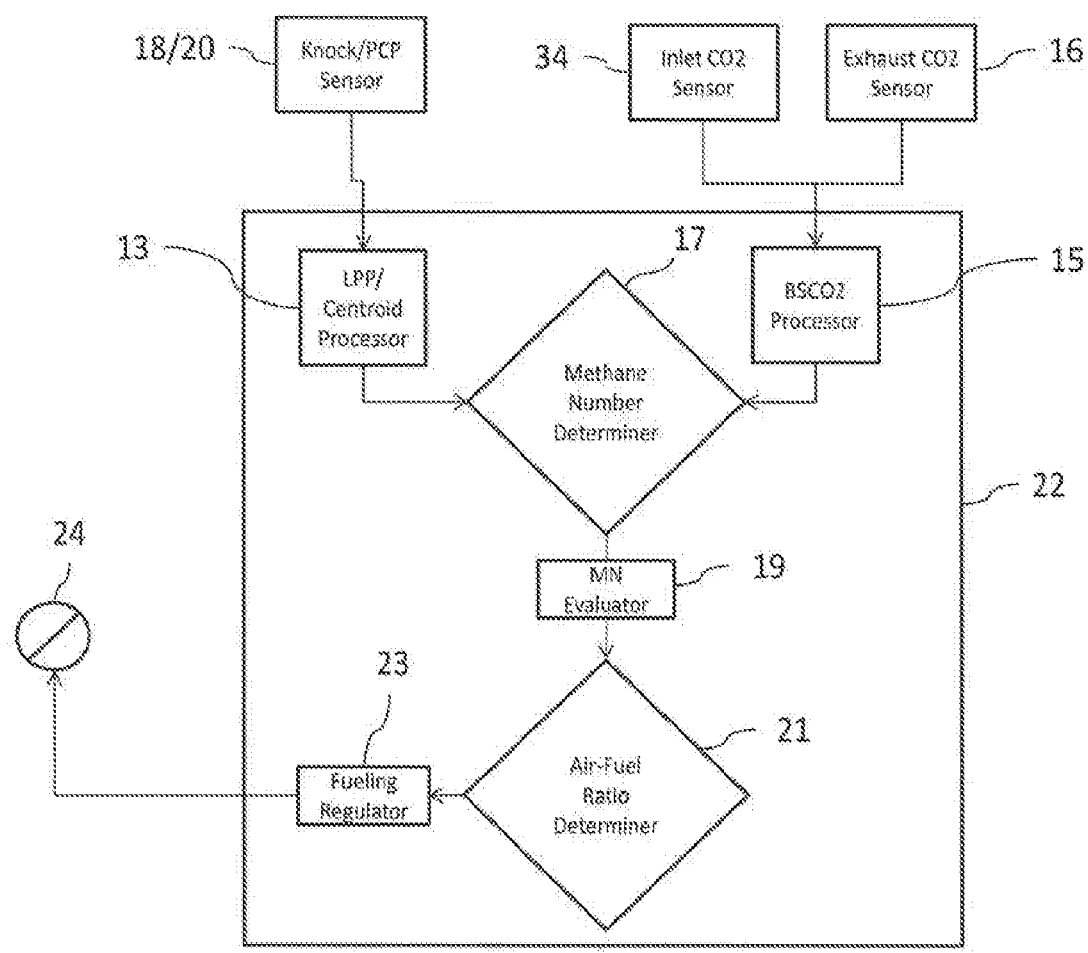
FIG. 8 is a schematic view of the controller configurations of the engine system of FIG. 3.

Referring back to FIG. 3, engine system 10 may further include an inlet sensor 34 and a correcting processor 36. Inlet sensor 34 may be positioned at any location upstream of cylinders of the engine. For instance, inlet sensor 34 may be positioned along fuel line 38 leading to mixer 12, in the charge stream from mixer 12 to engine 32, at a fuel inlet, at an inlet to mixer 12, at an outlet of mixer 12, at a turbocharger(s) inlet, at a turbocharger(s) outlet, at a charger air cooler(s) inlet, at a charger air cooler(s) outlet, or before or after one or more throttles or intake manifolds. Furthermore, inlet sensor 34 may be used to measure the level of intake carbon dioxide present in fuel being provided to engine 32. Additionally, correcting processor 36 may be used to subtract the level of intake carbon dioxide from the level of exhaust carbon dioxide prior to calculating the brake specific carbon dioxide value using brake specific carbon dioxide processor 15 of controller 22. In various embodiments, correcting processor 36 may be part of controller 22. In various embodiments, as seen in FIG. 8, inlet sensor 34 may be configured to transmit the level of inlet carbon dioxide directly to BSCO2 processor 15. Thus, in various embodiments, BSCO2 processor 15 may include correcting processor 36.

Figure 9:
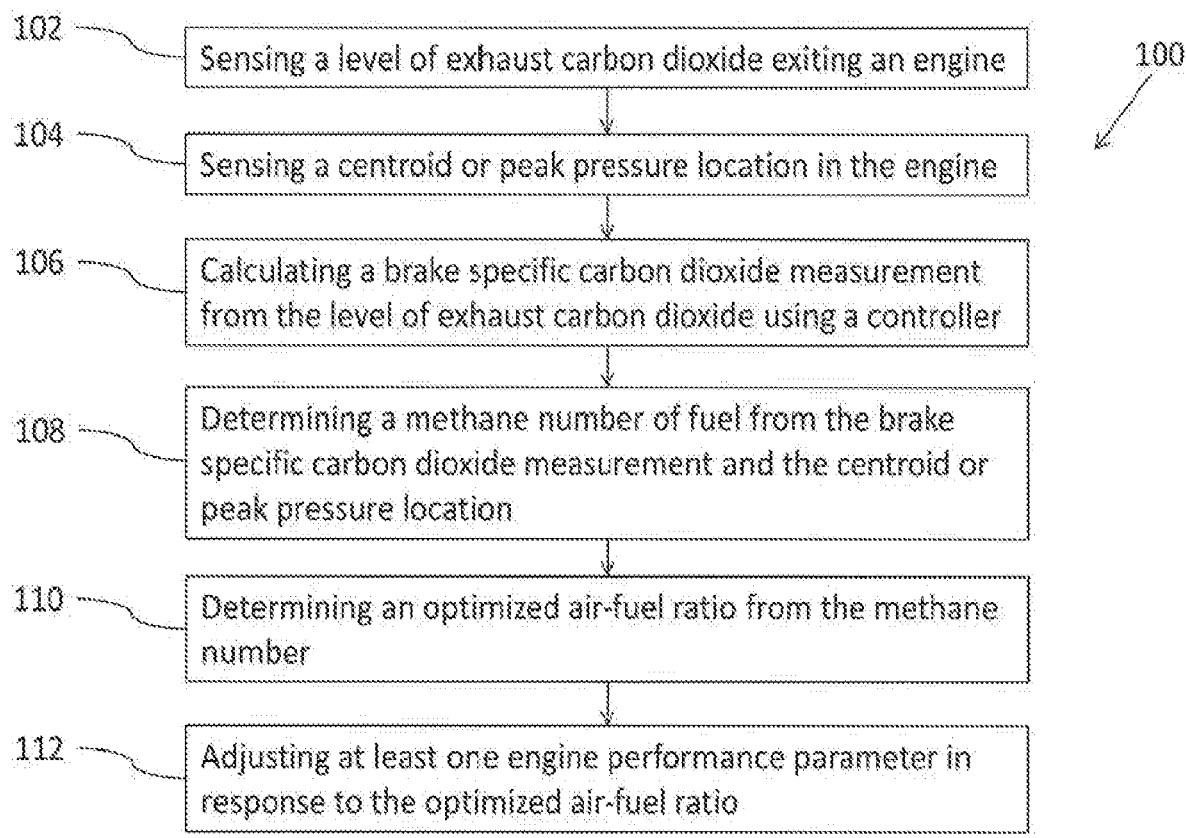
FIG. 9 is a flow diagram of a method of operating the engine system of FIG. 1.

Referring now to FIG. 9, a method 100 for self-adjusting engine performance in response to fuel quality variations using engine system 10 of the present disclosure is shown. At step 102 of method 100, a level of exhaust carbon dioxide exiting engine 32 is sensed. At step 104, a centroid and/or location of peak pressure in engine 32 is sensed. At step 106, a brake specific carbon dioxide value is calculated from the level of exhaust carbon dioxide using correlations within controller 22. At step 108, a methane number of fuel used by engine 32 is determined from the determined brake specific carbon dioxide value and the centroid and/or location of peak pressure. At step 110, an optimized air-fuel ratio is determined from the methane number. At step 112, an engine performance parameter is adjusted in response to the optimized air-fuel ratio. In an exemplary embodiment, the engine performance parameter is the quantity of fuel supplied.

Figure 10:
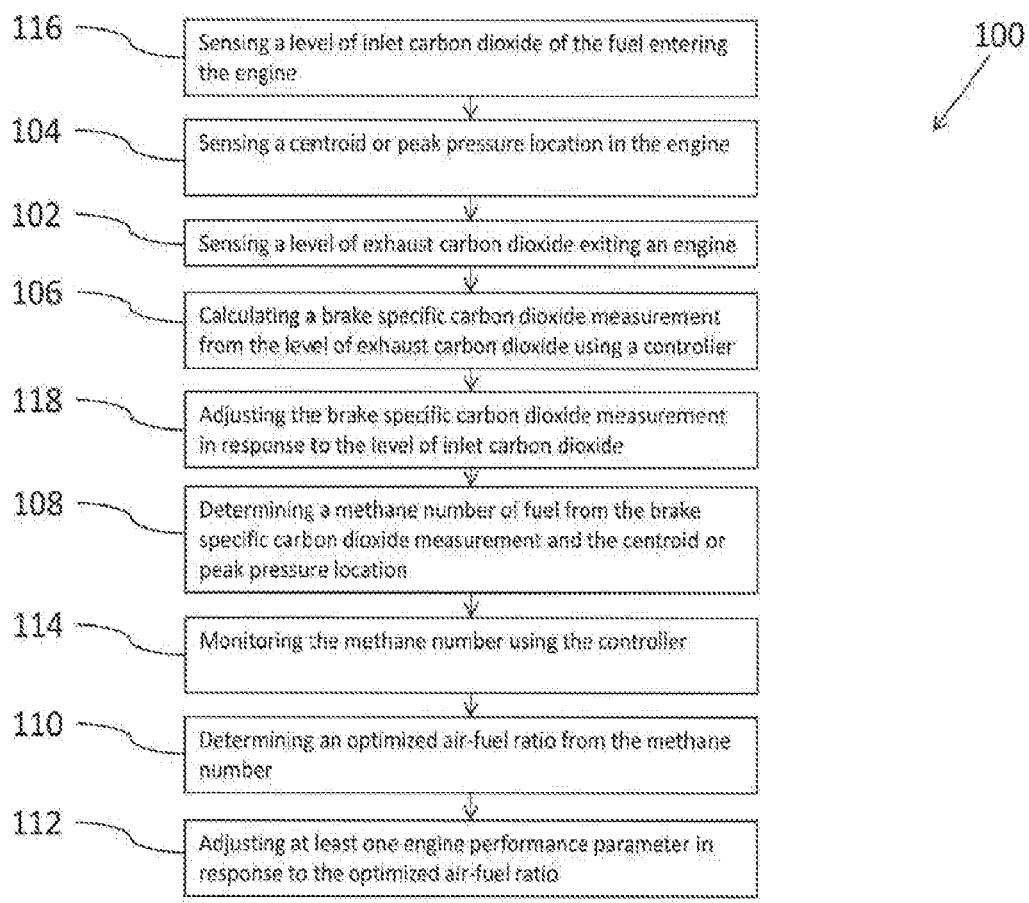
FIG. 10 is a flow diagram of a method of operating the engine system of FIG. 3.

Referring to FIG. 10, method 100 may further include the steps 114,116 and 118. At step 114, the methane number is monitored using methane number evaluator 19 of controller 22. At step 116, a level of inlet carbon dioxide of the fuel entering engine 32 is sensed. At step 118, the determined brake specific carbon dioxide value is adjusted in response to the level of inlet carbon dioxide.

Controller 22 may be used to calculate the brake specific carbon dioxide value from the exhaust carbon dioxide level, determine the methane number of fuel used within the engine from the determined brake specific carbon dioxide value and the centroid or the location of peak pressure, determine the optimized air-fuel ratio from the methane number, and adjust an engine performance parameter based on the optimized air-fuel ratio.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for self-adjusting engine performance parameters in response to fuel quality variations, comprising:
   sensing a level of exhaust carbon dioxide exiting an engine;
   sensing at least one of a centroid of the engine and a location of peak pressure in the engine;
   calculating a brake specific carbon dioxide value from the level of exhaust carbon dioxide using correlations accessed by a controller;
   determining a methane number of fuel used by the engine from the determined brake specific carbon dioxide value and the at least one of the centroid and the location of peak pressure using correlations accessed by the controller;
   determining an optimized air-fuel ratio from the methane number; and
   adjusting at least one engine performance parameter in response to the optimized air-fuel ratio.

2. The method of claim 1, wherein calculating the brake specific carbon dioxide value from the level of exhaust carbon dioxide, determining the methane number of fuel used within the engine from the determined brake specific carbon dioxide value and the at least one of the centroid and the location of peak pressure, determining the optimized air-fuel ratio from the methane number, and adjusting at least one engine performance parameter based on the optimized air-fuel ratio are carried out by the controller.

3. The method of claim 1, wherein the controller is an engine control module.

4. The method of claim 1, wherein the level of exhaust carbon dioxide is measured by an exhaust sensor.

5. The method of claim 1, wherein the centroid of the engine is determined by a cylinder pressure transducer.

6. The method of claim 1, wherein the location of peak pressure of the engine is determined by a knock sensor.

7. The method of claim 1, wherein determining the methane number of fuel used within the engine comprises using a table programmed into the controller which correlates the determined brake specific carbon dioxide value and the at least one of the centroid and the location of peak pressure with an associated methane number.

8. The method of claim 1, wherein determining the optimized air-fuel ratio from the methane number comprises using a table programmed into the controller which correlates the methane number with an associated optimized air-fuel ratio.

9. The method of claim 1 further comprising:
   monitoring the methane number using the controller.

10. The method of claim 1 further comprising:
    sensing a level of inlet carbon dioxide of fuel entering the engine; and
    adjusting the determined brake specific carbon dioxide value in response to the level of inlet carbon dioxide.

11. The method of claim 10, wherein the level of inlet carbon dioxide is measured by an inlet sensor.

12. An engine system comprising:
    a mixer configured to deliver air and fuel to the engine;
    an exhaust manifold coupled to the engine to route exhaust away from the engine;
    an exhaust sensor positioned to measure a level of carbon dioxide present in the exhaust within the exhaust manifold;
    at least one of a knock sensor and a cylinder pressure transducer, wherein the knock sensor determines a location of peak pressure within the engine and the cylinder pressure transducer determines a centroid of the engine;
    a controller in communication with the exhaust sensor and the at least one of the knock sensor and the cylinder pressure transducer, the controller being configured to access a plurality of programmable tables, wherein at least one of the plurality of programmable tables correlates a determined brake specific carbon dioxide value calculated using the level of carbon dioxide measured by the exhaust sensor and the at least one of the centroid and the location of peak pressure to a methane number of the fuel used by the engine, the controller being configured to determine the methane number using the tables; and
    an adjusting mechanism, wherein the adjusting mechanism adjusts at least one engine performance parameter based on the determined methane number.

13. The engine system of claim 12, wherein the adjusting mechanism is a fuel control valve, the fuel control valve being configured to control an amount of fuel delivered to the mixer in response to an optimized air-fuel ratio determined from the methane number by the controller.

14. The engine system of claim 13, wherein the optimized air-fuel ratio is determined using at least one of the plurality of programmable tables, wherein the at least one of the plurality of programmable tables correlates the methane number with an associated optimized air-fuel ratio.

15. The engine system of claim 12, wherein the controller is an engine control module.

16. The engine system of claim 12, further comprising:
    an inlet sensor positioned upstream of the engine, wherein the inlet sensor measures a level of intake carbon dioxide; and
    a correcting processor, wherein the correcting processor adjusts the determined brake specific carbon dioxide value in response to the level of intake carbon dioxide measured by the inlet sensor.

17. An engine control module coupled to an engine for self-adjusting engine performance parameters in response to fuel quality variations, wherein the engine control module is configured to:
    receive an exhaust carbon dioxide value from an exhaust sensor and at least one of a centroid value from a cylinder pressure transducer and a location of peak pressure value from a knock sensor;
    process the exhaust carbon dioxide value and the at least one of the centroid value and the location of peak pressure value; and
    control an adjusting mechanism in response to the processed exhaust carbon dioxide value and the processed at least one of the centroid value and the location of peak pressure value.

18. The engine control module of claim 17, wherein the engine control module is configured to determine a brake specific carbon dioxide value from the exhaust carbon dioxide value.

19. The engine control module of claim 18, wherein the engine control module is configured to determine a methane number of fuel used by the engine from the determined brake specific carbon dioxide value and the processed at least one of the centroid value and the location of peak pressure value.

20. The engine control module of claim 18, wherein the engine control module is configured to:
   receive an inlet carbon dioxide value from an inlet sensor; and
   adjust the determined brake specific carbon dioxide value in response to the inlet carbon dioxide value.

* * * * *